United States Patent [19]
Hagimori

[11] Patent Number: 5,721,643
[45] Date of Patent: Feb. 24, 1998

[54] ZOOM LENS SYSTEM

[75] Inventor: Hitoshi Hagimori, Nara-Ken, Japan

[73] Assignee: Minolta Co., Ltd., Osaka, Japan

[21] Appl. No.: 618,456

[22] Filed: Mar. 14, 1996

[30] Foreign Application Priority Data

Mar. 20, 1995 [JP] Japan .................. 7-061052

[51] Int. Cl.$^6$ .................................. G02B 15/14
[52] U.S. Cl. ........................................ 359/689
[58] Field of Search ...................... 359/689, 683, 359/685

[56] References Cited

U.S. PATENT DOCUMENTS 5,331,463  7/1994  Yamanashi ................. 359/689
5,528,429  6/1996  Hagimori ................... 359/689

FOREIGN PATENT DOCUMENTS 588085   4/1993  Japan .
5113539  5/1993  Japan .
6067093  3/1994  Japan .

Primary Examiner—David C. Nelms
Assistant Examiner—John P. Cornely
Attorney, Agent, or Firm—Price, Gess & Ubell

[57] ABSTRACT

A zoom lens system includes from the object side a first lens unit having a positive refractive power, a second lens unit having a positive refractive power, and a third lens unit having a negative refractive power. The third lens unit includes from the object side a positive lens and a negative lens. The zoom lens system meets the following conditions.

$$1 < |f_{3P}/f_3| < 3.05$$

$$0.1 < |f_3/f_T| < 0.22$$

where
$f_{3P}$: focal length of the positive lens,
$f_3$: focal length of the third lens unit, and
$f_T$: longest focal length of the entire system.

16 Claims, 8 Drawing Sheets

FNO=3.62

— d
—·— g
----- SC

SPHERICAL ABERRATION
SINE CONDITION

Y'=17.25

----- DM
——— DS

ASTIGMATISM

Y'=17.25

DISTORTION

FNO=7.44

— d
—·— g
----- SC

SPHERICAL ABERRATION
SINE CONDITION

Y'=17.25

----- DM
——— DS

ASTIGMATISM

Y'=17.25

DISTORTION

FNO= 10.18 d
g
SC

-1.0  1.0
SPHERICAL ABERRATION
SINE CONDITION

Y'= 17.25

---- DM
—— DS

-1.0  1.0
ASTIGMATISM

Y'= 17.25

-5.0  5.0
DISTORTION

FNO= 3.62 d
g
SC

-1.0  1.0
SPHERICAL ABERRATION
SINE CONDITION

Y'= 17.25

---- DM
—— DS

-1.0  1.0
ASTIGMATISM

Y'= 17.25

-5.0  5.0
DISTORTION

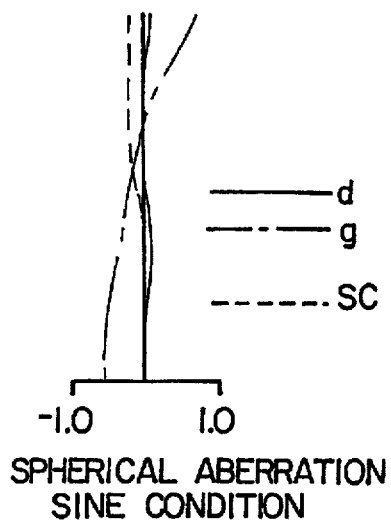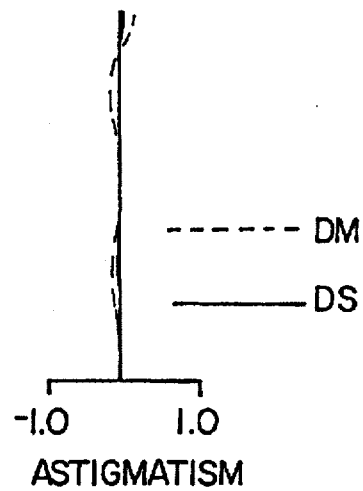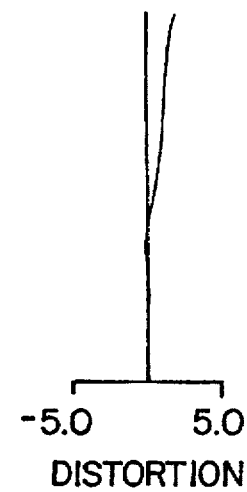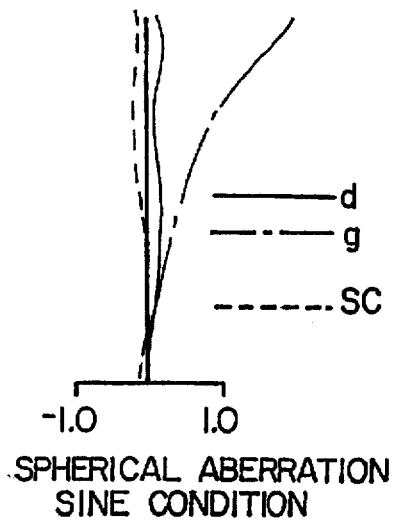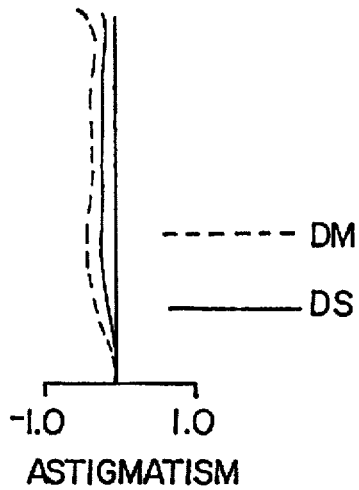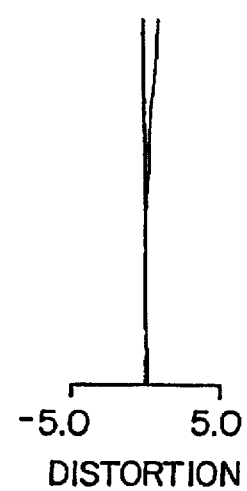

FNO = 3.62
—— d
—·— g
----- SC
-1.0   1.0
SPHERICAL ABERRATION
SINE CONDITION

Y' = 17.25
----- DM
—— DS
-1.0   1.0
ASTIGMATISM

Y' = 17.25
-5.0   5.0
DISTORTION

FNO = 7.44
—— d
—·— g
----- SC
-1.0   1.0
SPHERICAL ABERRATION
SINE CONDITION

Y' = 17.25
----- DM
—— DS
-1.0   1.0
ASTIGMATISM

Y' = 17.25
-5.0   5.0
DISTORTION

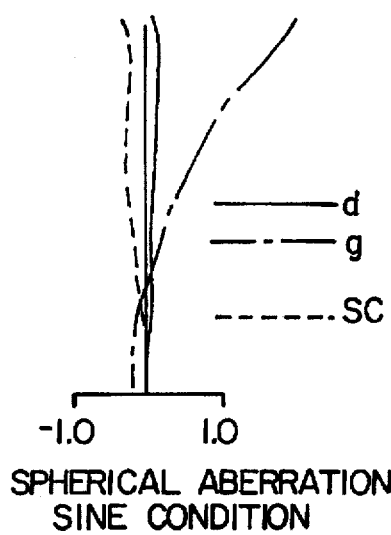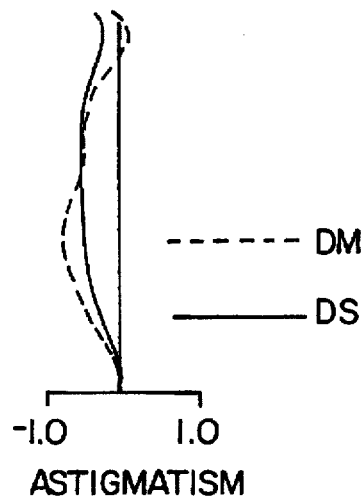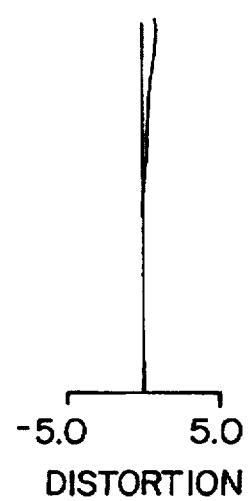
FIG. 13A FNO=10.18 SPHERICAL ABERRATION SINE CONDITION
FIG. 13B Y'=17.25 ASTIGMATISM
FIG. 13C Y'=17.25 DISTORTION

ZOOM LENS SYSTEM

BACKGROUND OF THE INVENTION

1. Field of the Invention

The present invention pertains to a zoom lens system, and more particularly, to a compact and high magnification zoom lens system that is suitable for lens shutter cameras and video cameras.

2. Description of the Related Art

Compactness and high magnification have been conventionally required of zoom lens systems. A zoom lens system having a positive-negative two-unit construction comprising a front lens unit with a positive refractive power and a rear lens unit with a negative refractive power, said lens units placed in that order from the object side, and having a zoom ration of 2 to 2.5, is known as a compact zoom lens system. On the other hand, a zoom lens system having a positive-positive-negative three-unit construction comprising a first lens unit with a positive refractive power, a second lens unit with a positive refractive power and a third lens unit with a negative refractive power, said lens unit being placed in that order, has been conventionally used as a zoom lens system in which high magnification is achieved.

However, with regard to the conventional technologies described above, the zoom lens system of the former positive-negative two-unit construction experiences difficulty in obtaining good performance and the amounts of movement of each of the lens units increase, if a zoom ratio of 2.5–3.0 or larger is attempted. Therefore, this construction fails to realize a compact zoom lens system having a high zoom ratio.

On the other hand, with the zoom lens system having the latter positive-positive-negative three-unit construction, positive distortion easily occurs in the wide angle condition due to its construction, and preventing this from happening is one of the objects in designing the lens system. However, if it is attempted to correct the positive distortion in the wide angle condition, the number of lenses increases.

SUMMARY OF THE INVENTION

The main object of the present invention is to provide a compact zoom lens system having a high zoom ratio.

Another object of the present invention is to provide a zoom lens system having a high zoom ratio and comprising a small number of lenses.

These and other objects are attained by providing a zoom lens system comprising from the object side a first lens unit having a positive refractive power, a second lens unit having a positive refractive power and a third lens unit having a negative refractive power, wherein said third lens unit includes from the object side a positive lens having a positive refractive power and a negative lens having a negative refractive power, in which said zoom lens system meets the following conditions.

$1 < |f_{3P}/f_3| < 3.05$ $0.1 < |f_3/f_T| < 0.22$ where $f_{3P}$: focal length of said positive lens;
$f_3$: focal length of said third lens unit; and
$f_T$: longest focal length of the entire system.

BRIEF DESCRIPTION OF THE DRAWINGS

These and other objects and features of the present invention will be apparent from the following description with reference to the accompanying drawings.

FIGS. 9A through 9C show aberrations pertaining to the second embodiment in the middle focal length condition.

FIGS. 10A through 10C show aberrations pertaining to the second embodiment in the longest focal length condition.

FIGS. 13A through 13C show aberrations pertaining to the third embodiment in the longest focal length condition.

DETAILED DESCRIPTION OF THE PREFERRED EMBODIMENT

The embodiments of the present invention are explained below.

Tables 1 through 3 show first through third embodiments. In each table, ri (i=1, 2, 3, . . . ) represents the radius of curvature of the ith lens surface from the object side; di (i=1, 2, 3, . . . ) represents the ith axial distance from the object side; and Ni (i=1, 2, 3, . . . ) and vi (i=1, 2, 3, . . . ) represent the refractive index and the Abbe number, to the d-line of the ith lens from the object side, respectively. FL represents the focal length of the entire zoom lens system and Fno. represents the full aperture F-number. With regard to FL, Fno., d4 and d8, values in the shortest focal length condition, middle focal length condition and longest focal length condition are shown in that order from the left. Further, the number after letter "E" in each coefficient is equivalent to the index of the coefficient. For example, 1.0E+02 means $1.0 \times 10^2$.

In each embodiment, the surfaces marked with asterisks in the radius of curvature column are aspherical. The configuration of the aspherical surface is defined by the following equation (A).

$$X = C \cdot Y^2 / \{1 + \sqrt{1 - \epsilon \cdot Y^2 \cdot C^2}\} + \Sigma Ai \cdot Y^i \quad (A)$$

where

X: amount of displacement from the reference surface along the optical axis;
Y: height in the direction perpendicular to the optical axis;
C: reference curvature of the aspherical surface;
ε: quadric surface parameter; and
Ai (i=1, 2, 3, . . . ): aspherical coefficient.

Figure 1:
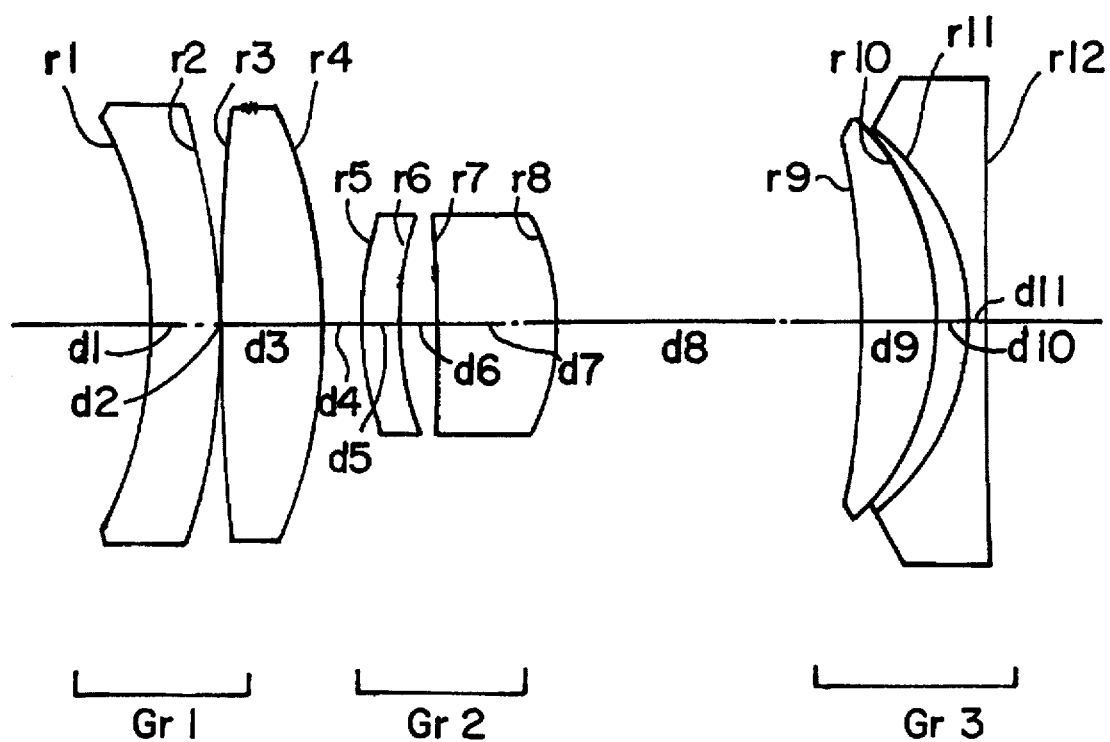
FIG. 1 shows the construction pertaining to a first embodiment of the zoom lens system of the present invention.
Figure 2:
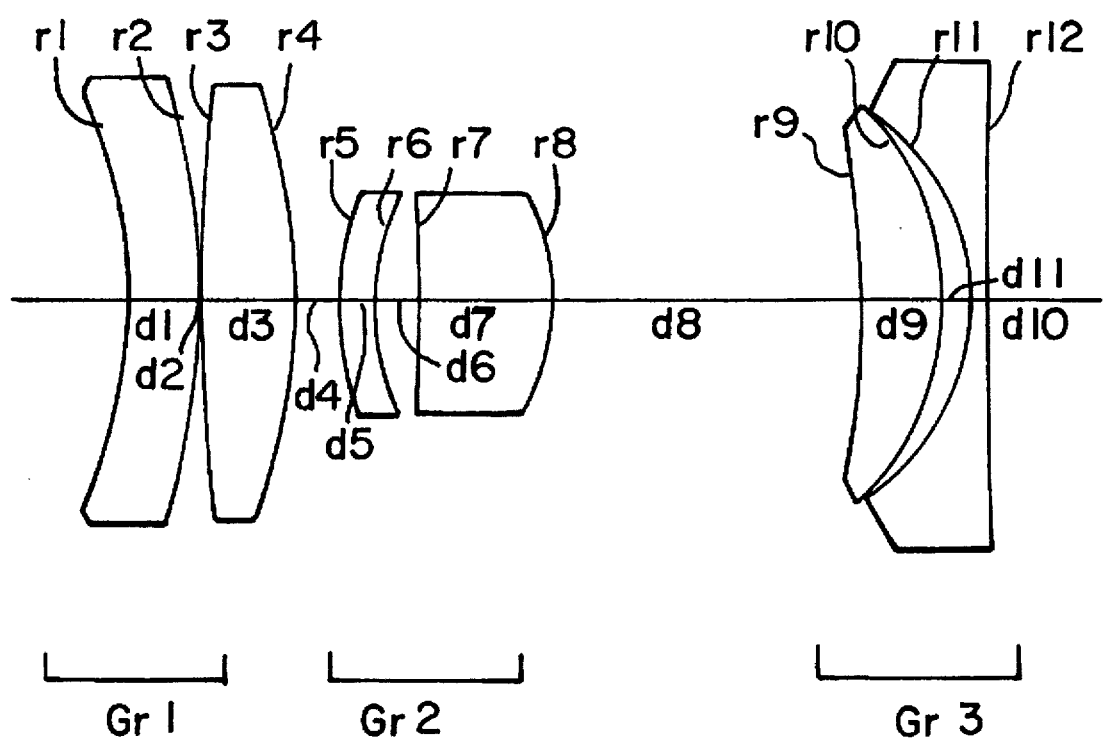
FIG. 2 shows the construction pertaining to a second embodiment of the zoom lens system of the present invention.
Figure 3:
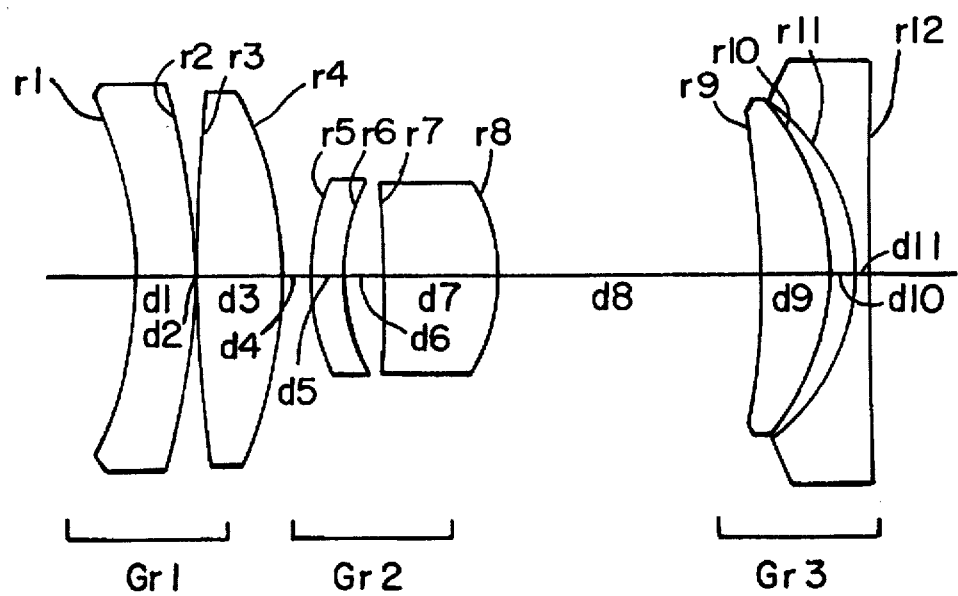
FIG. 3 shows the construction pertaining to a third embodiment of the zoom lens system of the present invention.

FIGS. 1 through 3 shows the arrangement of the lenses in the shortest focal length condition in the first through third embodiments.

The zoom lens system comprises from the object side first lens unit Gr1 having a positive refractive power, second lens unit Gr2 having a positive refractive power and third lens unit Gr3 having a negative refractive power. First lens unit Gr1 comprises a first lens having a negative meniscus configuration where the convex surface is located on the image side, and a second lens that is a positive lens having convex surfaces on both sides. Second lens unit Gr2 comprises a third lens having a negative meniscus configuration where the concave surface is located on the image side and both surfaces are aspherical, and a fourth lens having a positive meniscus configuration where the convex surface is located on the image side. Third lens unit Gr3 comprises a fifth lens having a positive meniscus configuration where the convex surface is located on the image side and both surfaces are aspherical, and a sixth lens that is a negative lens having concave surfaces on both sides.

In the second and third embodiments, the sixth lens has a negative meniscus configuration with the convex surface located on the image side. The constructions of the first through fifth lenses in the second and third embodiments are approximately the same as those of the first through fifth lenses in the first embodiment.

The shortest focal length is 30.8 mm and the longest focal length is 117.0 mm in all of the first through third embodiments. In other words, the zoom lens system of all of the three embodiments has a zoom ratio of approximately 3.8.

The first through third embodiments meet the following condition (1).

$$1 < |f_{3P}/f_3| < 3.05 \quad (1)$$

where $f_{3P}$: focal length of the positive lens of the third lens unit; and $f_3$: focal length of the third lens unit.

Condition (1) is a condition required in order to adequately reduce the absolute value of the Petzval sum and reduce off-axial chromatic aberration when the third lens unit includes a positive lens and a negative lens in that order from the object side, in a three-unit zoom lens system of a positive-positive-negative three unit construction. Petzval sum P for the entire zoom lens system is defined by the following equation.

$$P = \Sigma(\Phi i/Ni) = \Phi 1/N1 + \cdots + \Phi_{3P}/N_{3P} + \Phi_{3N}/N_{3N} + \cdots$$

where $\Phi 1$: refractive index of the first lens from the object side;

$\Phi_{3P}$: refractive index of the positive lens of the third lens unit;

$\Phi_{3N}$: refractive index of the negative lens of the third lens unit;

N1: refractive power of the first lens from the object side;

$N_{3P}$: refractive power of the positive lens of the third lens unit; and $N_{3N}$: refractive power of the negative lens of the third lens unit.

If the lower limit of condition (1) is not met, the Petzval sum of the entire zoom lens system increases in the plus direction and image field performance deteriorates. This is explained below.

If the lower limit of condition (1) is not met, the focal length of the positive lens of the third lens unit decreases, and as a result the absolute value of refractive power $|\Phi_{3P}|$ increases and conversely the absolute value of refractive power a $|\Phi_{3N}|$ of the negative lens of the third lens unit relatively decreases. In addition, in order to compensate for chromatic aberrations, refractive index $N_{3N}$ of the negative lens is set to be larger than refractive index $N_{3P}$ of the positive lens. Consequently, the contribution of term $\Phi_{3P}/N_{3P}$ to the Petzval sum becomes larger than that of term $\Phi_{3N}/N_{3N}$. Thus, if the lower limit of condition (1) is not met, Petzval sum P increases in the plus direction.

In addition, if the lower limit of condition (1) is not met, negative off-axial chromatic aberration in the wide angle range increases, which is not desirable. Off-axial chromatic aberration coefficient Ti is provided by the following equation (C).

$$Ti = (\Phi i/vi) hi \cdot hi' \quad (C)$$

where $\Phi i$: refractive power;

vi: Abbe number;

hi: height of axial ray; and hi': height of principal ray.

It is seen from equation (C) above that whether the off-axial chromatic aberration coefficient is a positive or negative number is determined by the sign [+or −] of the refractive power. In other words, if the refractive power of the positive lens of the third lens unit increases, the off-axial chromatic aberration coefficient increases in the plus direction, and if the refractive power of the negative lens of the third lens unit increases, off-axial chromatic aberration coefficient increases in the minus direction. In the third lens unit, Abbe number $v_{3N}$ of the negative lens is set to be smaller than Abbe number $v_{3P}$ of the positive lens in order to compensate for chromatic aberrations. As a result, the positive lens contributes to off-axial chromatic aberration to a larger degree than the negative lens in the third lens unit. Therefore, if the lower limit of condition (1) is not met, off-axial chromatic aberration for the entire zoom lens system increases in the minus direction.

On the other hand, if the upper limit of condition (1) is exceeded, an action quite the opposite of what was explained above takes place: the Petzval sum increases in the minus direction, causing the image field performance to deteriorate, and off-axial chromatic aberration in the telephoto range increases in the plus direction.

The first through third embodiments meet the following condition (2).

$$0.1 < |f_3/f_T| < 0.22 \quad (2)$$

where $f_3$: focal length of the third lens unit; and $f_T$: longest focal length of the entire zoom lens system.

Condition (2) is a condition required to compensate for distortion and off-axial chromatic aberration when the third lens unit includes from the object side a positive lens and a negative lens, in a zoom lens system of a positive-positive-negative three-unit construction.

If the lower limit of condition (2) is not met, refractive power $\Phi 3$ of the third lens unit relatively increases and distortion increases in the plus direction. Distortion is affected by the nature of negative refractive power $\Phi 3$ of the third lens unit to fan out the incident light rays. The larger the height of the principal ray into the third lens unit, the more markedly this phenomenon manifests and the height of the principal ray increases as the focal length approaches the wide angle end. As a result, distortion that occurs when the lower limit of condition (2) is not met becomes more marked as the focal length of the entire zoom lens system approaches the wide angle end.

When the lower limit of condition (2) is not met, off-axial chromatic aberration in the telephoto range also increases in the plus direction.

On the other hand, if the upper limit of condition (2) is exceeded, refractive power Φ3 of the third lens unit relatively decreases and the fanning of the off-axial ray on the image surface becomes smaller. Consequently, transverse chromatic aberration in the wide angle range increases in the minus direction and good performance cannot be ensured. Further, the amount of movement of the third lens unit during zooming increases, which is disadvantageous in constructing the lens mount and hinders the attainment of a compact zoom lens system.

The first through third embodiments meet the following condition (3).

$$0.5 < N_{3N}/d_{P-N} < 2.0 \quad (3)$$

where $N_{3N}$: refractive index of the negative lens of the third lens unit; and $d_{P-N}$: spatial distance between the positive lens and the negative lens of the third lens unit.

Condition (3) is a condition concerning ghost light in the wide angle range when the third lens unit comprises two lenses, one positive lens and one negative lens, said lenses being placed in that order from the object side, in a zoom lens system of a positive-positive-negative three-unit construction.

A minimum of two lenses, one positive and one negative, are required to compensate for chromatic aberrations. Therefore, as long as uniform medium lenses are used, two is theoretically the minimum number.

Figure 4:
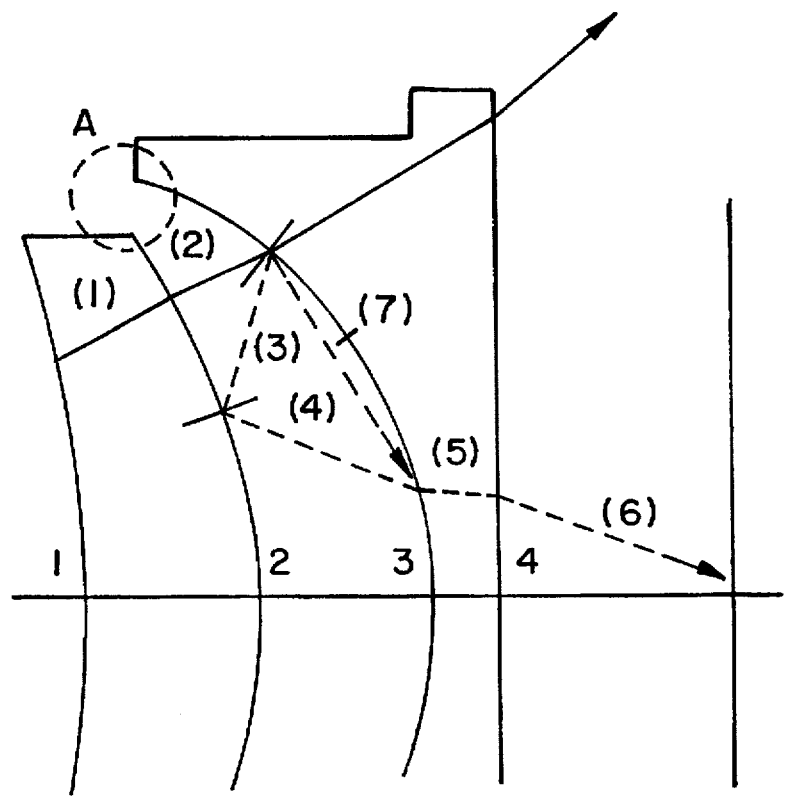
FIG. 4 is a simplified schematic drawing to explain ghost light.
Figure 5A:
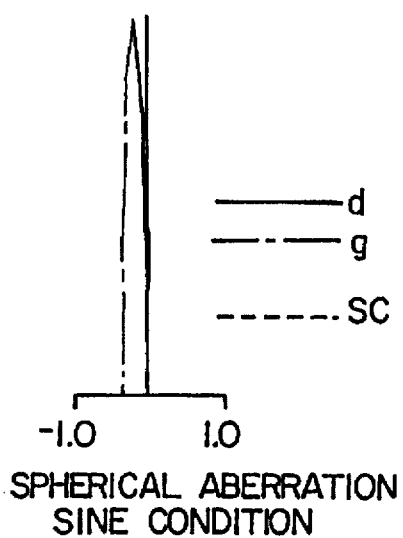
FIGS. 5A through 5C show aberrations pertaining to the first embodiment in the shortest focal length condition.
Figure 5B:
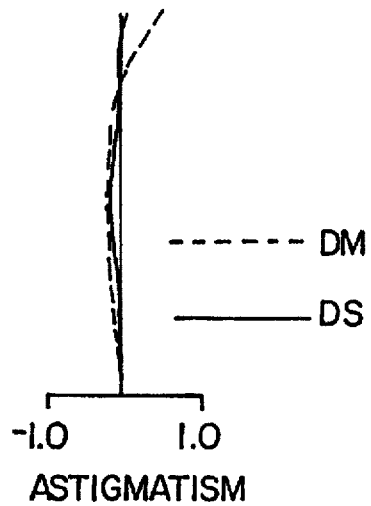
Figure 5C:
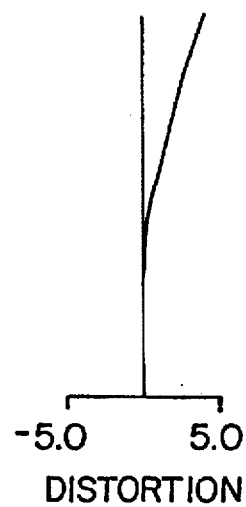
Figure 6A:
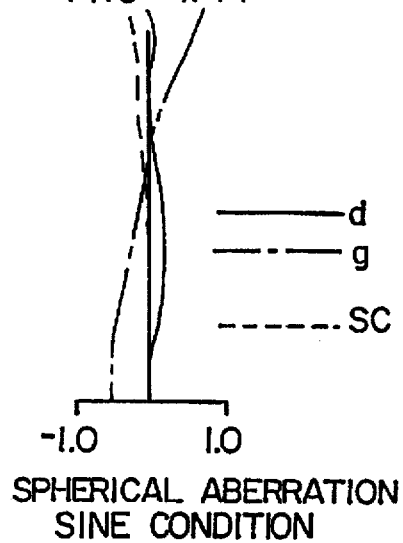
FIGS. 6A through 6C show aberrations pertaining to the first embodiment in the middle focal length condition.
Figure 6B:
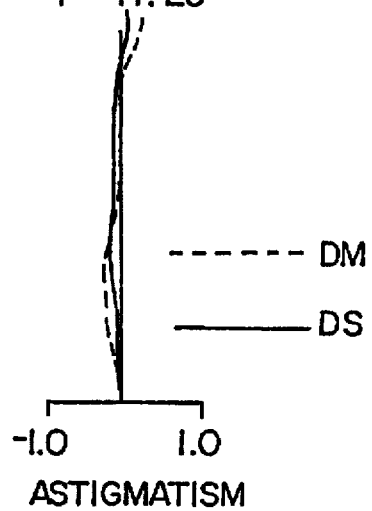
Figure 6C:
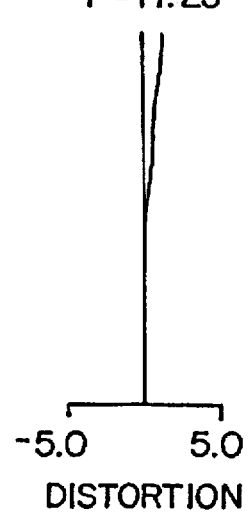
Figure 7A:
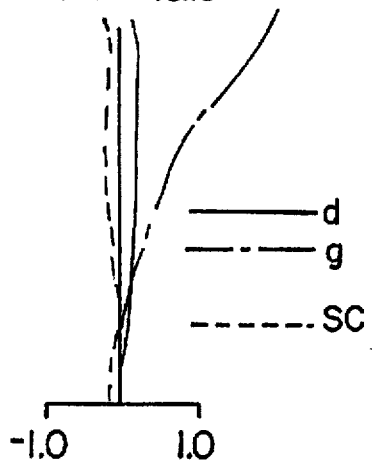
FIGS. 7A through 7C show aberrations pertaining to the first embodiment in the longest focal length condition.
Figure 7B:
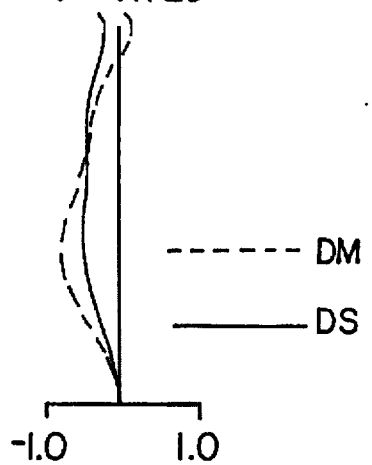
Figure 7C:
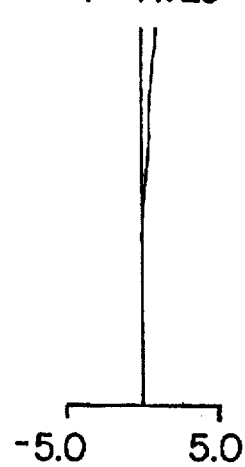
Figure 8A:
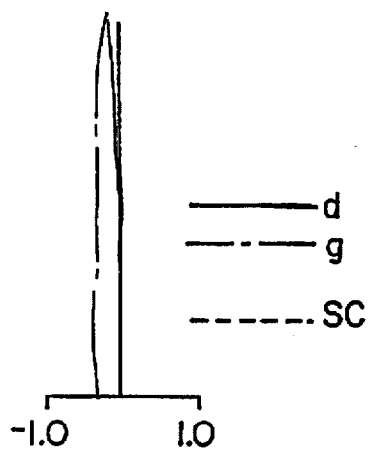
FIGS. 8A through 8C show aberrations pertaining to the second embodiment in the shortest focal length condition.
Figure 8B:
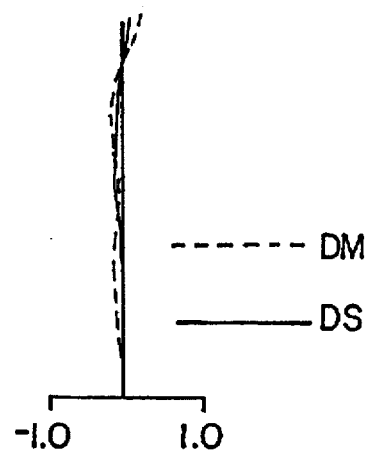
Figure 8C:
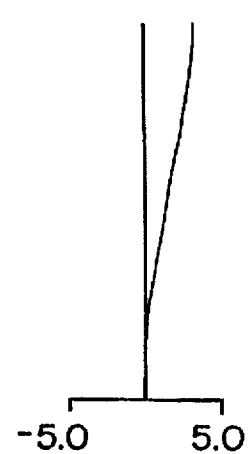
Figure 11A:
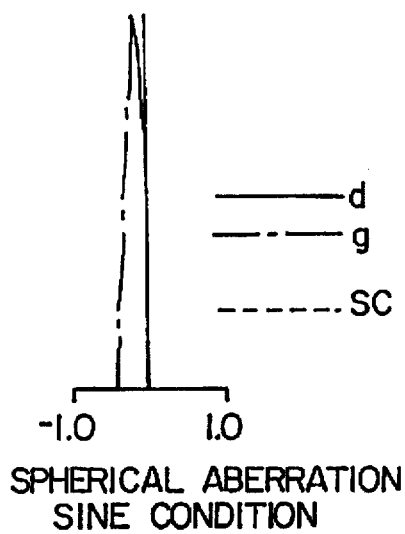
FIGS. 11A through 11C show aberrations pertaining to the third embodiment in the shortest focal length condition.
Figure 11B:
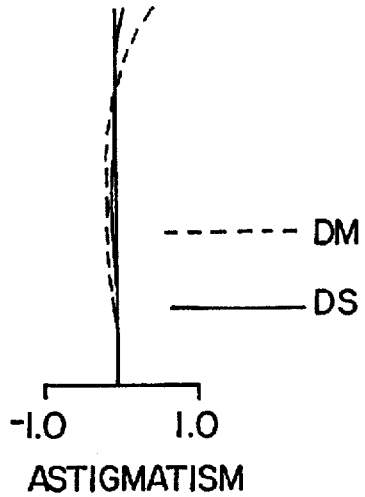
Figure 11C:
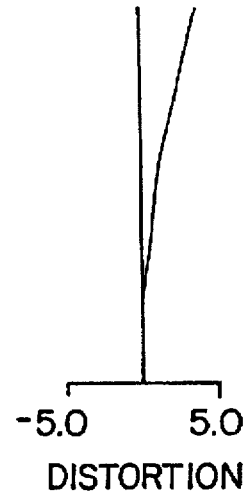
Figure 12A:
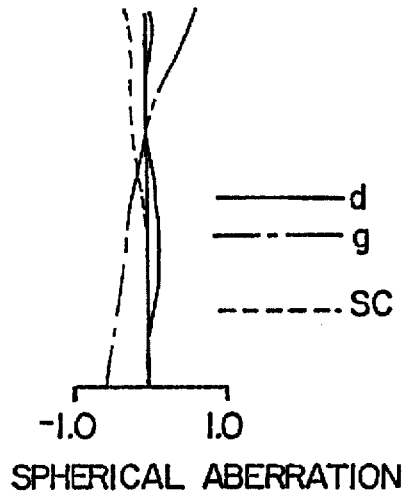
FIGS. 12A through 12C show aberrations pertaining to the third embodiment in the middle focal length condition.
Figure 12B:
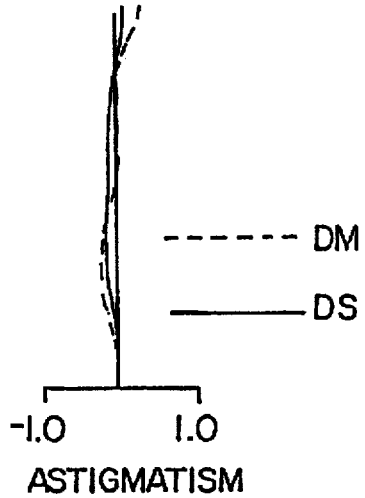
Figure 12C:
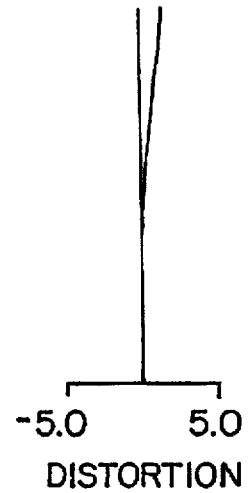

First, the ghost light in the wide angle range is explained with reference to FIG. 4. FIG. 4 shows in a simplified fashion the third lens unit of the zoom lens system of the present invention in the shortest focal length condition. In FIG. 4, the third lens unit comprises, from the object side, a positive meniscus lens having the convex surface on the image side and a negative meniscus lens having the convex surface on the image side. Here the lens surfaces will be termed surface 1, surface 2, surface 3 and surface 4 from the object side.

In FIG. 4, among light rays that entered surface 1 (1) and exited surface 2 (2), normal light rays enter surface 3 and exit surface 4 to form an image (indicated by a solid line in the drawing). However, some of the light rays that exited surface 2 (2) are reflected by surface 3 (3) and become ghost light. They then are reflected by surface 2 (4) and enter at surface 3 (5), after which they exit surface 4 (6) and returns to the image plane, whereby causing deterioration of the image as a ghost flare (indicated by a dotted line in the drawing).

The lower limit of condition (3) is not met where the refractive index $N_{3N}$ of the negative lens is small and where the spatial distance $d_{P-N}$ between the positive and negative lenses is large. When the refractive index $N_{3N}$ of the negative lens is small, the ghost light that entered surface 3 of the negative lens (5) exits surface 4, moving toward the optical axis (6), and generates a ghost flare around the center of the image. If $d_{P-N}$ becomes too large, the light rays among the light rays that exited surface 2 and that become ghost light are reflected by the peripheral areas of surface 3.

Consequently, the angle of reflection of the ghost light on surface 3 increases and the ghost light directly enters the negative lens via surface 3 (7). Ghost flare is created around the center of the image in this case as well. Therefore, in either case, ghost flare is created around the center of the image field, which causes the image to deteriorate.

On the other hand, the upper limit of condition (3) is exceeded where the refractive index $N_{3N}$ of the negative lens is large and where the spatial distance $d_{P-N}$ between the positive and negative lenses is small. Because the angle of refraction of surface 3 decreases when the refractive index $N_{3N}$ of the negative lens increases, the reflectance of surface 3 increases, and the intensity of the ghost flare increases. If $d_{P-N}$ decreases, surface 2 and surface 3 come close to each other near the edges of the positive lens and the negative lens (A in FIG. 4). If surface 2 and surface 3 come too close to each other, the luminous intensity in the wide angle condition can no longer be secured. The luminous intensity in the wide angle condition may be secured if the radius of curvature of surface 3 increases, but if the radius of curvature of surface 3 becomes too large, spherical aberration and coma aberration in the telephoto condition increase.

The first through third embodiments meet the following condition (4).

$$0.3 < |f_{3PB}/f_{3NF}| < 1.4 \quad (4)$$

where $f_{3PB}$: focal length of the image side surface of the positive lens of the third lens unit; and $f_{3NF}$: focal length of the object side surface of the negative lens of the third lens unit.

Condition (4) is a condition pertaining to the focal lengths of the lenses when the third lens unit comprises two lenses, one positive lens and one negative lens, said lenses being placed in that order from the object side, in a zoom lens system of a positive-positive-negative three-unit construction.

If the upper limit of condition (4) is exceeded, the absolute value of focal length $f_{3PB}$ of the image side surface of the positive lens increases relative to the absolute value of focal length $f_{3NF}$ of the object side surface of the negative lens. Consequently, the absolute value of the radius of curvature of surface 2 increases, and as a result the angle of incidence of ghost light (3) on surface 2 increases. If the angle of incidence of ghost light (3) on surface 2 increases, reflected ghost light (4) becomes bent further down, and a ghost flare is created around the center of the image.

On the other hand, if the lower limit of condition (4) is not met, the absolute value of focal length f3PB of the image side surface of the positive lens decreases relative to the absolute value of focal length $f_{3NF}$ of the object side surface of the negative lens, and the radius of curvature of surface 3 increases. In this case, spherical aberration and coma aberration in the telephoto condition increase, as described above.

In a zoom lens system of a positive-positive-negative construction as described above, the lens unit having a positive refractive power preferably includes a negative lens and a positive lens, said lenses placed in that order from the object side, and the negative lens unit having a negative refractive power preferably includes a positive lens and a negative lens in that order from the object side. This has the effect of ensuring a longer back focal distance in the wide angle range.

The first through third embodiments meet the following condition (5).

$$1.3 < |f_{1N}/f_W| < 5.1 \tag{5}$$

where $f_{1N}$: focal length of the negative lens of the first lens unit; and $f_W$: focal length of the entire zoom lens system in the wide angle range.

Condition (5) indicates a condition pertaining to the focal length that must be attained by the negative lens of the first lens unit where, in a zoom lens system of a positive-positive-negative three-unit construction, the first lens unit includes a negative lens and a positive lens in that order from the object side, the second lens unit includes a negative lens and a positive lens in that order from the object side, and the third lens unit includes a negative lens and a positive lens in that order from the object side.

If the lower limit of condition (5) is not met, the value of $f_{1N}$ relatively decreases, as a result of which refractive power $\Phi_{1N}$ of the negative lens of the first lens unit increases. When refractive power $\Phi_{1N}$ increases, various aberrations occur. In particular, because axial incident light height h when light strikes each lens located on the image side of the negative lens of the first lens unit increases, compensation for spherical aberration and coma aberration, the occurrence of which is largely influenced by axial incident light height h, becomes difficult. In this case, transverse chromatic aberration in the wide angle condition also increases in the minus direction.

On the other hand, if the upper limit of condition (5) is exceeded, the value of $f_{1N}$ relatively increases, and as a result refractive power $\Phi_{1N}$ of the negative lens of the first lens unit decreases. Therefore, the retropower of the first lens unit weakens, and back focal length in the wide angle range can no longer be secured. In addition, due to the reduction in negative refractive power, compensation for the increase in distortion in the positive direction in the wide angle condition, as well as for the increase in transverse chromatic aberration in the positive direction in the telephoto condition, becomes difficult.

The first through third embodiments meet the following condition (6).

$$3.5 < |f_{2N}/f_W| < 12 \tag{6}$$

where $f_{2N}$: focal length of the negative lens of the second lens unit; and $f_W$: focal length of the entire zoom lens system at the wide angle end.

Condition (6) indicates a condition pertaining to the focal length that must be attained by the negative lens of the second lens unit where, in a zoom lens system of a positive-positive-negative three-unit construction, the first lens unit includes a negative lens and a positive lens in that order from the object side, the second lens unit includes a negative lens and a positive lens in that order from the object side, and the third lens unit includes a positive lens and a negative lens in that order from the object side.

If the lower limit of condition (6) is not met, the value of $f_{2N}$ relatively decreases, and as a result refractive power $\Phi_{2N}$ of the negative lens of the second lens unit increases. When refractive power $\Phi_{2N}$ increases, compensation for spherical aberration and coma aberration, the occurrence of which is largely influenced by axial incident light height h, becomes difficult, as in the case of condition (5).

On the other hand, if the upper limit of condition (6) is exceeded, the retropower of the second lens unit weakens, and back focal length in the wide angle range can no longer be secured.

The first through third embodiments meet the following condition (7).

$$1 < |f_{3P}/f_W| < 2.5 \tag{7}$$

where $f_{3P}$: focal length of the positive lens of the third lens unit; and $f_W$: shortest focal length of the entire zoom lens system.

Condition (7) indicates a condition to make the absolute value of the Petzval sum sufficiently small and reduce off-axial chromatic aberration where, in a lens system of a positive-positive-negative three-unit construction, the first lens unit includes a negative lens and a positive lens in that order from the object side, the second lens unit includes a negative lens and a positive lens in that order from the object side, and the third lens unit includes a positive lens and a negative lens in that order from the object side.

Condition (7) is a condition in which the rationale discussed in connection with the explanation of condition (1) is expanded from the third lens unit to the entire zoom lens system. In other words, because the rationale regarding the upper and lower limits is exactly the same as for condition (1), an explanation thereof is omitted.

If the lower limit of condition (7) is not met, the Petzval sum for the entire zoom lens system increases in the plus direction and image plane performance deteriorates. Moreover, off-axial chromatic aberration increases in the minus direction in the wide angle condition.

On the other hand, if the upper limit of condition (7) is exceeded, conversely, the Petzval sum increases in the minus direction, resulting in a deterioration of image plane performance and an increase in off-axial chromatic aberration in the negative direction in the telephoto condition.

Table 4 shows values for each condition in the first through third embodiments. In the table, $N_{3N}$, $d_{P-N}$, $r_{3PB}$ and $r_{3NF}$ correspond to N6, d10, r10* and r11 in Tables 1 through 3.

Where a positive-positive-negative three-lens unit zoom lens system comprises the theoretical minimum of six lenses, if only spherical lenses are used, compensation for chromatic aberrations is possible, but the ability to compensate for monochromatic aberration is limited.

In this case, if an aspherical surface is employed as a lens surface included in the second lens unit, incident light height h of the axial light striking the lenses included in the second lens unit and incident light height h' of the principal ray striking the lenses included in the second lens unit can be controlled, which is effective in the elimination of spherical aberration and coma aberration in the telephoto range.

Further, if an aspherical surface is employed as a lens surface included in the third lens unit, incident light height h' of the principal ray striking the lenses included in the third lens unit can be controlled, which is effective in the elimination of distortion in the wide angle range.

FIGS. 5A through 5C, 8A through 8C and 11A through 11C show aberrations in the shortest focal length in the first through third embodiments, FIGS. 6A through 6C, 9A through 9C and 12A through 12C show aberrations in the middle focal length in the first through third embodiments, and FIGS. 7A through 7C, 10A through 10C and 13A through 13C show aberrations in the longest focal length in the first through third embodiments. In the drawings showing spherical aberrations in FIGS. 5A through 13A, solid line (d) indicates d-line spherical aberration, dashed line (g) indicates g-line spherical aberration, and dotted line (SC) indicates a sine condition. In addition, in the drawings showing astigmatism in FIGS. 5B through 13B, broken line (DM) and solid line (DS) indicate astigmatism on the meridian and sagittal surfaces, respectively.

TABLE 1

FL: 30.8~80.0~117.0
Fno.: 3.6~7.4~10.2

| Radius of Curvature | | Axial Distance | | Refractive Index(Nd) | | Abbe number |
|---|---|---|---|---|---|---|
| r1 | −21.347 | d1 | 3.300 | N1 1.83400 | ν1 | 37.34 |
| r2 | −34.775 | d2 | 0.100 | | | |
| r3 | 122.277 | d3 | 4.800 | N2 1.48749 | ν2 | 70.44 |
| r4 | −28.540 | d4 | 2.241~24.697~30.171 | | | |
| r5* | 14.242 | d5 | 1.750 | N3 1.84666 | ν3 | 23.82 |
| r6* | 12.378 | d6 | 1.950 | | | |
| r7 | −70.993 | d7 | 6.250 | N4 1.48749 | ν4 | 70.44 |
| r8 | −11.078 | d8 | 15.210~5.718~3.330 | | | |
| r9* | −42.000 | d9 | 3.850 | N5 1.58340 | ν5 | 30.23 |
| r10* | −16.528 | d10 | 1.650 | | | |
| r11 | −11.350 | d11 | 0.800 | N6 1.80420 | ν6 | 46.50 |
| r12 | 273.334 | | | | | |

| Aspherical coefficient | | | | |
|---|---|---|---|---|
| | r5 | r6 | r9 | r10 |
| ε | 1.00000 | 1.00000 | 1.00000 | 1.00000 |
| A3 | | | −0.64739E-03 | −0.71805E-03 |
| A4 | −0.15943E-03 | −0.97377E-04 | 0.43159E-03 | 0.27369E-03 |
| A5 | | | −0.10893E-03 | −0.40566E-04 |
| A6 | −0.48147E-05 | −0.75056E-05 | 0.13437E-04 | −0.17442E-05 |
| A7 | | | 0.29826E-06 | 0.12331E-06 |
| A8 | −0.11688E-08 | 0.96763E-07 | −0.21444E-06 | 0.22604E-06 |
| A9 | | | −0.23491E-08 | −0.36455E-07 |
| A10 | 0.23419E-09 | −0.15924E-08 | 0.26706E-08 | 0.17169E-09 |
| A11 | | | 0.73038E-10 | 0.26468E-09 |
| A12 | −0.22960E-10 | −0.18430E-10 | −0.26216E-10 | −0.13134E-10 |
| A13 | | | 0.91222E-14 | −0.23717E-13 |
| A14 | | 0.12488E-13 | 0.12153E-13 | |
| A15 | | | 0.24048E-14 | |
| A16 | | 0.17586E-14 | | 0.34663E-15 |

TABLE 2

FL: 30.8~80.0~117.0
Fno.: 3.6~7.5~10.2

| Radius of Curvature | | Axial Distance | | Refractive Index(Nd) | | Abbe number |
|---|---|---|---|---|---|---|
| r1 | −22.717 | d1 | 3.300 | N1 1.83400 | ν1 | 37.34 |
| r2 | −37.495 | d2 | 0.100 | | | |
| r3 | 104.662 | d3 | 4.500 | N2 1.48749 | ν2 | 70.44 |
| r4 | −30.222 | d4 | 2.087~24.133~30.127 | | | |
| r5* | 13.815 | d5 | 1.750 | N3 1.84666 | ν3 | 23.82 |
| r6* | 11.971 | d6 | 1.950 | | | |
| r7 | −71.350 | d7 | 6.650 | N4 1.48749 | ν4 | 70.44 |
| r8 | −10.889 | d8 | 15.030~5.690~3.330 | | | |
| r9* | −35.987 | d9 | 3.823 | N5 1.58340 | ν5 | 30.23 |
| r10* | −15.620 | d10 | 1.640 | | | |
| r11 | −10.902 | d11 | 0.800 | N6 1.80420 | ν6 | 46.50 |
| r12 | −71123.744 | | | | | |

| Aspherical coefficient | | | | |
|---|---|---|---|---|
| | r5 | r6 | r9 | r10 |
| ε | 1.00000 | 1.00000 | 1.00000 | 1.00000 |
| A3 | | | −0.59265E-03 | −0.60680E-03 |
| A4 | −0.12982E-03 | −0.58531E-04 | 0.43632E-03 | 0.25933E-03 |
| A5 | | | −0.10846E-03 | −0.38924E-04 |
| A6 | −0.49704E-05 | −0.75738E-05 | 0.13666E-04 | −0.16150E-05 |
| A7 | | | 0.31081E-06 | 0.12843E-06 |
| A8 | 0.38381E-09 | 0.95197E-07 | −0.21365E-06 | 0.23579E-06 |
| A9 | | | −0.23347E-08 | −0.37015E-07 |
| A10 | 0.24522E-09 | −0.15980E-08 | 0.26723E-08 | 0.78901E-10 |
| A11 | | | 0.73762E-10 | 0.25994E-09 |
| A12 | −0.22912E-10 | −0.18443E-10 | −0.26069E-10 | −0.11886E-10 |

TABLE 2-continued

| | | |
|---|---|---|
| A13 | 0.92398E-14 | −0.19542E-13 |
| A14 | 0.12168E-13 | 0.23598E-15 |
| A15 | 0.24066E-14 | −0.10241E-16 |
| A16 | 0.34684E-15 | −0.50599E-17 |

TABLE 3

FL: 30.8~80.0~117.0
Fno.: 3.6~7.5~10.2

| Radius of Curvature | | Axial Distance | | Refractive Index(Nd) | | Abbe number |
|---|---|---|---|---|---|---|
| r1 | −22.929 | d1 | 3.300 | N1 1.83400 | ν1 | 37.34 |
| r2 | −38.018 | d2 | 0.100 | | | |
| r3 | 99.191 | d3 | 4.500 | N2 1.48749 | ν2 | 70.44 |
| r4 | −30.584 | d4 | 2.090~23.828~29.844 | | | |
| r5* | 13.907 | d5 | 1.750 | N3 1.84666 | ν3 | 23.82 |
| r6* | 12.046 | d6 | 1.950 | | | |
| r7 | −68.673 | d7 | 6.650 | N4 1.48749 | ν4 | 70.44 |
| r8 | −10.860 | d8 | 15.094~5.701~3.330 | | | |
| r9* | −36.743 | d9 | 3.800 | N5 1.58340 | ν5 | 30.23 |
| r10* | −15.740 | d10 | 1.650 | | | |
| r11 | −10.902 | d11 | 0.800 | N6 1.80420 | ν6 | 46.50 |
| r12 | −15603.054 | | | | | |

| Aspherical coefficient | | | | |
|---|---|---|---|---|
| | r5 | r6 | r9 | r10 |
| ε | 1.00000 | 1.00000 | 1.00000 | 1.00000 |
| A3 | | | −0.56215E-03 | −0.57959E-03 |
| A4 | −0.12384E-03 | −0.47795E-04 | 0.42957E-03 | 0.24716E-03 |
| A5 | | | −0.10922E-03 | −0.38955E-04 |
| A6 | −0.49649E-05 | −0.76169E-05 | 0.13641E-04 | −0.15897E-05 |
| A7 | | | 0.31230E-06 | 0.12966E-06 |
| A8 | 0.59053E-09 | 0.94915E-07 | −0.21337E-06 | 0.23561E-06 |
| A9 | | | −0.23069E-08 | −0.37356E-07 |
| A10 | 0.24701E-09 | −0.15989E-08 | 0.26746E-08 | 0.66586E-10 |
| A11 | | | 0.73951E-10 | 0.26185E-09 |
| A12 | −0.22903E-10 | −0.18444E-10 | −0.26053E-10 | −0.11542E-10 |
| A13 | | | 0.10649E-13 | 0.10745E-13 |
| A14 | | | 0.12293E-13 | 0.14575E-14 |
| A15 | | | 0.24174E-14 | −0.13274E-15 |
| A16 | | | 0.34775E-15 | −0.41584E-16 |

TABLE 4

| | | first embodiment | second embodiment | third embodiment |
|---|---|---|---|---|
| condition(1) | $|f_{3P}/f_3|$ | 2.26 | 2.27 | 2.26 |
| condition(2) | $|f_3/f_T|$ | 0.17 | 0.17 | 0.17 |
| condition(3) | $N_{3N}/d_{P-N}$ | 1.09 | 1.10 | 1.09 |
| condition(4) | $|f_{3PB}/f_{3NF}|$ | 0.69 | 0.70 | 0.69 |
| condition(5) | $|f_{1N}/f_W|$ | 2.42 | 2.50 | 2.50 |
| condition(6) | $|f_{2N}/f_W|$ | 6.36 | 6.09 | 6.06 |
| condition(7) | $f_{3P}/f_W$ | 1.44 | 1.44 | 1.44 |

What is claimed is:

1. A zoom lens system comprising, from an object side:

a first lens unit having positive optical power, the first lens unit consisting of two lens elements;

a second lens unit having positive optical power; and a third lens unit having negative optical power, the third lens unit consisting of, from the object side, a positive lens element having positive optical power and a negative lens element having negative optical power, wherein the zoom lens system fulfills the following conditions, $$1 < \left| \frac{f_{3P}}{f_3} \right| < 3.05$$

$$1 < \left| \frac{f_3}{f_T} \right| < 0.22$$

where $f_{3P}$=focal length of the positive lens element;
$f_3$=focal length of the third lens unit; and
$f_T$=longest focal length of the entire system.

2. A zoom lens system as claimed in claim 1, wherein the zoom lens system fulfills the following conditions, $$0.5 < \left| \frac{N_{3N}}{d_{P-N}} \right| < 2.0$$

$$0.3 < \left| \frac{f_{3PB}}{f_{3NF}} \right| < 1.4$$

where $N_{3N}$=refractive index of the negative lens element;
$d_{P-N}$=spatial distance between the positive lens element and the negative lens element;
$f_{3PB}$=focal length of the image side surface of the positive lens clement; and
$f_{3NF}$=focal length of the object side surface of the negative lens element.

3. A zoom lens system comprising, from an object side:
a first lens unit having positive optical power;
a second lens unit having positive optical power, the second lens unit consisting of two lens elements; and
a third lens unit having negative optical power, the third lens unit consisting of, from the object side, a positive lens element having positive optical power and a negative lens element having negative optical power,
wherein the zoom lens system fulfills the following conditions, $$1 < \left| \frac{f_{3P}}{f_3} \right| < 3.05$$

$$1 < \left| \frac{f_3}{f_T} \right| < 0.22$$

where $f_{3P}$=focal length of the positive lens element;
$f_3$=focal length of the third lens unit; and
$f_T$=longest focal length of the entire system.

4. A zoom lens system as claimed in claim 3, wherein the zoom lens system fulfills the following conditions, $$0.5 < \frac{N_{3N}}{d_{P-N}} < 2.0$$

$$0.3 \left| \frac{f_{3PB}}{f_{3NF}} < 1.4 \right|$$

where $N_{3N}$=refractive index of the negative lens element;
$d_{P-N}$=spatial distance between the positive lens element and the negative lens element;
$f_{3PB}$=focal length of the image side surface of the positive lens clement; and
$f_{3NF}$=focal length of the object side surface of the negative lens element.

5. A zoom lens system comprising, from an object side:
a first lens unit having positive optical power, the first lens unit consisting of, from the object side, a first lens element having negative optical power and a second lens element having positive optical power;
a second lens unit having positive optical power, the second lens unit including, from the object side, a third lens element having negative optical power and a fourth lens element having positive optical power; and
a third lens unit having negative optical power, the third lens unit including, from the object side, a fifth lens element having positive optical power and a sixth lens element having negative optical power,
wherein the zoom lens system fulfills the following conditions, $$1.3 < \left| \frac{f_{1N}}{f_W} \right| < 5.1$$

$$3.5 < \left| \frac{f_{2N}}{f_W} \right| < 12$$

where $f_{1N}$=focal length of the first lens element of the first lens unit;
$f_{2N}$=focal length of the third lens element of the second lens unit; and
$f_W$=shortest focal length of the entire system.

6. A zoom lens system as claimed in claim 5, wherein the third lens unit consists of only the fifth lens element and the sixth lens element.

7. A zoom lens system as claimed in claim 5, wherein the zoom lens system fulfills the following conditions, $$1 < \left| \frac{f_{3P}}{f_W} \right| < 2.5$$

where $f_{3P}$=focal length of the fifth lens element;
$f_3$=focal length of the third lens unit; and
$f_W$=shortest focal length of the entire system.

8. A zoom lens system as claimed in claim 5, wherein at least one aspherical surface is included in either the second or third lens unit.

9. A zoom lens system comprising, from an object side:
a first lens unit having positive optical power, the first lens unit including, from the object side, a first lens element having negative optical power and a second lens element having positive optical power;
a second lens unit having positive optical power, the second lens unit consisting of, from the object side, a third lens element having negative optical power and a fourth lens element having positive optical power; and
a third lens unit having negative optical power, the third lens unit including, from the object side, a fifth lens element having positive optical power and a sixth lens element having negative optical power,
wherein the zoom lens system fulfills the following conditions, $$1.3 < \left| \frac{f_{1N}}{f_W} \right| < 5.1$$

-continued $$3.5 < \left| \frac{f_{2N}}{f_W} \right| < 12$$

where
- $f_{1N}$=focal length of the first lens element of the first lens unit;
- $f_{2N}$=focal length of the third lens element of the second lens unit; and
- $f_W$=shortest focal length of the entire system.

10. A zoom lens system as claimed in claim 9, wherein the third lens unit consists of only the fifth lens element and the sixth lens element.

11. A zoom lens system as claimed in claim 9, wherein the zoom lens system fulfills the following conditions, $$1 < \left| \frac{f_{3P}}{f_W} \right| < 2.5$$

where
- $f_{3P}$=focal length of the fifth lens element;
- $f_3$=focal length of the third lens unit; and
- $f_W$=shortest focal length of the entire system.

12. A zoom lens system as claimed in claim 9, wherein at least one aspherical surface is included in either the second or third lens unit.

13. A zoom lens system comprising, from an object side:
- a first lens unit having positive optical power, the first lens unit consisting of, from the object side, a first lens element having negative optical power and a second lens element having positive optical power;
- a second lens unit having positive optical power, the second lens unit consisting of, from the object side, a third lens element having negative optical power and a fourth lens element having positive optical power; and
- a third lens unit having negative optical power, the third lens unit including, from the object side, a fifth lens element having positive optical power and a sixth lens element having negative optical power, wherein the zoom lens system fulfills the following conditions, $$1.3 < \left| \frac{f_{1N}}{f_W} \right| < 5.1$$

$$3.5 < \left| \frac{f_{2N}}{f_W} \right| < 12$$

where
- $f_{1N}$=focal length of the first lens element of the first lens unit;
- $f_{2N}$=focal length of the third lens element of the second lens unit; and
- $f_W$=shortest focal length of the entire system.

14. A zoom lens system as claimed in claim 13, wherein the third lens unit consists of only the fifth lens element and the sixth lens element.

15. A zoom lens system as claimed in claim 13, wherein the zoom lens system fulfills the following conditions, $$1 < \left| \frac{f_{3P}}{f_W} \right| < 2.5$$

where
- $f_{3P}$=focal length of the fifth lens element;
- $f_3$=focal length of the third lens unit; and
- $f_W$=shortest focal length of the entire system.

16. A zoom lens system as claimed in claim 13, wherein at least one aspherical surface is included in either the second or third lens unit.

* * * * *